United States Patent [19]

Geoffray et al.

[11] Patent Number: 4,670,212

[45] Date of Patent: Jun. 2, 1987

[54] TEMPERATURE SENSOR FOR A PRESSURIZED WATER NUCLEAR REACTOR COOLANT CIRCULATION

[75] Inventors: Rémy Geoffray, Vaulx-en-Velin; Daniel Jacobzone, Lyons, both of France

[73] Assignee: Pyro-Controle, Vaulx-en-Velin, France

[21] Appl. No.: 697,740

[22] Filed: Feb. 4, 1985

[30] Foreign Application Priority Data

Feb. 7, 1984 [FR] France .................................. 84 02247

[51] Int. Cl.[4] ............................................. G21C 17/00
[52] U.S. Cl. .................................... 376/247; 136/230; 136/234
[58] Field of Search ................. 376/247; 136/230, 234; 374/208, 209

[56] References Cited

U.S. PATENT DOCUMENTS

| 2,838,935 | 6/1958 | Cecio et al. | 374/208 |
| 3,716,450 | 2/1973 | Lions | 376/247 |
| 3,913,058 | 10/1975 | Nishio et al. | 136/230 |
| 4,106,983 | 8/1978 | Meuschke et al. | 376/247 |
| 4,355,912 | 10/1982 | Haak | 374/208 |
| 4,444,516 | 4/1984 | Dostoomian et al. | 374/208 |
| 4,450,315 | 5/1984 | Waterman | 136/230 |
| 4,454,370 | 6/1984 | Voznick | 136/230 |
| 4,515,484 | 5/1985 | Gilley | 136/230 |
| 4,558,959 | 12/1985 | Thomas et al. | 374/208 |

FOREIGN PATENT DOCUMENTS 1334550 10/1973 United Kingdom ............... 374/208

*Primary Examiner*—Salvatore Cangialosi
*Attorney, Agent, or Firm*—Karl F. Ross; Herbert Dubno

[57] ABSTRACT

The temperature sensor has a sheath with a closed end within a structure traversed by the primary coolant of high pressurized water reactor and frustoconically tapered at this end to close fittingly engage the frustoconical tip of the sensor. The latter can be of the platinum wire type whose resistance measurement represents the temperature.

10 Claims, 8 Drawing Figures

TEMPERATURE SENSOR FOR A PRESSURIZED WATER NUCLEAR REACTOR COOLANT CIRCULATION

FIELD OF THE INVENTION

Our present invention relates to a temperature sensor and, more particularly, to a rapid-response temperature sensor and especially a fast-response temperature sensor for measuring the temperature in a coolant loop of a pressurized water nuclear reactor.

BACKGROUND OF THE INVENTION

It is important to provide temperature sensors with high response times in nuclear reactor applications and, in particular, for measuring the temperature at upstream and downstream sides of the nuclear reactor core in a coolant loop of a pressurized water nuclear reactor.

A pressurized water nuclear reactor (PWR) generally has a coolant loop or circulation path which includes a pump for displacing the water coolant under pressure through the nuclear reactor core, an expansion chamber or accumulator for taking up pressure surges, and as a heat exchanger, a boiler or vapor generator which is heated by the coolant at elevated temperatures derived from the PWR.

In a system of that type, a temperature sensor can be provided to effect three principal functions:

1. Measurement of the power generated.

The measurement of the power generated can be effected by application of a law of the type:

$$P = Q_1 - Q_2$$

with $$Q_{(1,2)} = MCT_{(1,2)}$$

in which:
Q is the quantity of heat supplied per unit of time and $Q_1$ is the heat per unit of time at the inlet of the exchanger while the heat flow at the outlet of the heat exchanger is represented at $Q_2$;
M is the mass flow of the heat carrying fluid per unit of time;
C is the specific heat of the fluid at the temperature under consideration; and
T is the absolute temperature of the fluid.

If the quantities of the fluid entering and leaving the exchanger are equal:

$$P = MC\Delta T$$

where $\Delta T = T_1 - T_2$.

The precision with which the power can be measured thus required precise knowledge of the quantity of water circulated in the loop, the absolute temperature in order to determine with precision the specific heat, and the difference between the inlet and outlet temperature of the exchanger or the vapor or steam generator.

The energy produced by the nuclear reactor can only be withdrawn in a useable manner under thermodynamicokinetic conditions in the core of the reactor which can be generalized as requiring a high volumetric flow rate and a low thermal gradient.

Present instruments permit determination of flow rates with the precision of about 1% and determination of temperature with a precision of about 0.1° C.

2. The safety of a PWR reactor is assured utilizing various sensors disposed throughout the plant perhaps the most important of them are temperature sensors which provide an indication of the instantaneous temperature prevailing at critical points in the cooling loop. As a consequence, the speed with which the temperature sensor responds to a change in temperature is basic to avoidance of incidents or accidents and to permit personnel to take immediate action to safeguard the reactor and its environment.

Present standards require that the thermometric sensor be capable within a maximum of four seconds, of providing a temperature which represents 63% the true value of a changed temperature to which the sensor is subject, i.e. 63% of the true temperature or temperature variation.

3. It is essential, considering the lowered exposure levels now deemed to be permissible for nuclear power plant operating personnel to provide the sensors so that they may be readily replaced in a minimum of time and with a minimum of complexity.

In the past, as the discussion below will show in greater detail, it has been deemed to be advantageous to provide the temperature sensors in bypasses of the pressurized water loop, i.e. in additional piping which is separate from the traversed by the main pressurized water flow. This system had the disadvantage of complicated mounting and dismounting, thereby requiring prolonged presence of the plant personnel at the high radiation sites. Because the temperature was taken in a bypass, moreover, the response time to the actual temperature in the cooling loop was low. This system could, however, utilize a sensor which made use of the change in resistivity of a platinum wire.

Another arrangement which was used provided a tubular finger or closed-end sheath which could project into the path of the liquid and into which a sensor was inserted. The adjustment of the sensor within the sheath was complex, irregular clearances were defined and the response time was poor because of the clearance required between the sensing end of the sensor and the sheath.

The system here was also susceptible to significant vibration which caused rapid deterioration of the sensor.

OBJECTS OF THE INVENTION

It is the principal object of our present invention to provide a temperature measuring instrument which overcomes the drawbacks of the prior art temperature measuring instruments described above and which, in particular, represents a significant advance in the use of platinum filaments as variable resistivity sensors.

Another object of this invention is to provide an instrument which has a greater precision of temperature measurement than prior art instruments, which has a more rapid response to temperature variation and indeed a response which is in excess of the standard now applied for nuclear reactor application, and which allows the sensor to be replaced conveniently and simply.

It is also an object of our invention to provide an improved temperature-measuring instrument whose static and dynamic characteristics are such that the measurements obtained are more reproducible than has hitherto been the case.

SUMMARY OF THE INVENTION

According to the invention a thermally conductive tubular element or sheath, closed at one end, is mounted so that at least this end projects into the path of the circulated water of a pressurized water reactor in the form of a glove-like finger, the finger having a cylindrical bore terminating at its end within the path of the water in a blind bore defined by a uniform thickness bore. The temperature sensor is provided with a platinum filament whose change in electrically conductivity or resistivity provides a measurement of the temperature, and which extends through this bore and has a sensing tip which is likewise tapered frustoconically to fit snugly within the frustoconical taper of the blind bore so that over the length of the tip and at least the greater part of the length of the blind bore there is snug, firm, all-around surface contact between the wall of the bore and the surface of the tip.

We have found that this eliminates the vibration effect entirely and provides highly reproducible dynamic and contact effects and further ensures a rapid transfer of heat through the wall of the sheath so that the response at the sensor far exceeds the acceptable standards applied heretofore in nuclear reactor applications.

More generally the configuration of the instrument allows it to be adapted to various liquid containing structures, for example, enabling it to be inserted and sealed in place in the pipelines or other elements of the cooling loop.

Both the response time and the insensitivity to vibration are greatly increased over prior art systems.

Since the instrument can be inserted directly into pipelines, it is not necessary to provide bypass paths.

Advantageously, the sensor is pressed by elastic means, e.g. a coil spring, in the direction of taper into the blind bore and thus is spring biased to maintain the firm contact of the tip in the sheath.

According to a feature of the invention, the temperature sensor is fixed in the sheath by a sleeve connected by a screwthread to the open end of the sheath which lies outside the pipe and forms an overhang against which the coil spring is seated, the opposite end of the coil spring being braced against a shoulder of the sensor in a direction biasing the latter in the direction of the taper of the tip of the sensor and the closed end of the sheath.

The taper angle has been found to be important and specifically we have determined that the angle between the generatrices of the tapered surface and the axis should be three degrees with a tolerance of 1 minute. Advantageously, the parts of the sensor and the sheath which are in surface contact with one another in the tapered region should have a roughness with an arithmetic mean value Ra less than 0.2.

Preferably and by way of a best mode example, the sheath can be formed from a forged or rolled austenitic stainless steel such as that represented by the standard designation Z2 CND 17-12 with a wall thickness of 3.5 millimeters while the temperature sensor has an outer member formed from pure silver which has been subjected to surface treatment and contains a platinum wire resistor having a resistance of 100 ohms at 0° C. for use in the primary cooling loop of a pressurized water nuclear reactor.

Under these conditions the response time is 2.56 seconds to 63% of the temperature increase at a temperature of about 285° C., a water pressure of about 155 bars and a water velocity of 6 meters per second.

According to a feature of the invention, the sheath need not be drawn or machined from a single piece but can be realized in two parts, one of these parts forming the shank while the other part forms the blind bore.

The first part, therefore, can be cylindrical and open at both ends while the second part is frustoconical and forms a closure for the end of the first part to be received in the pipe.

From the practical point of view it is preferred to start with a central cylindrical bore in a block of material and to drill from the tail end with traction to form the frustoconical zone with high precision. The surfaces are then polished and ground. Of course, the instrument can be fabricated by other means. A preferred alternative mode of fabricating the sheath is by electrodischarge machining or electrochemical machining.

The tip of the sensor can be turned, swaged or otherwise shaped to form the taper and can be polished and otherwise finished.

Advantageously, the interior of the sensor which receives the platinum wire of given resistivity at a particular temperature can maintain the thermal contact between the wire and surrounding shell of the sensor by compaction of high purity boron nitride in a powdered state between shell and wire.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
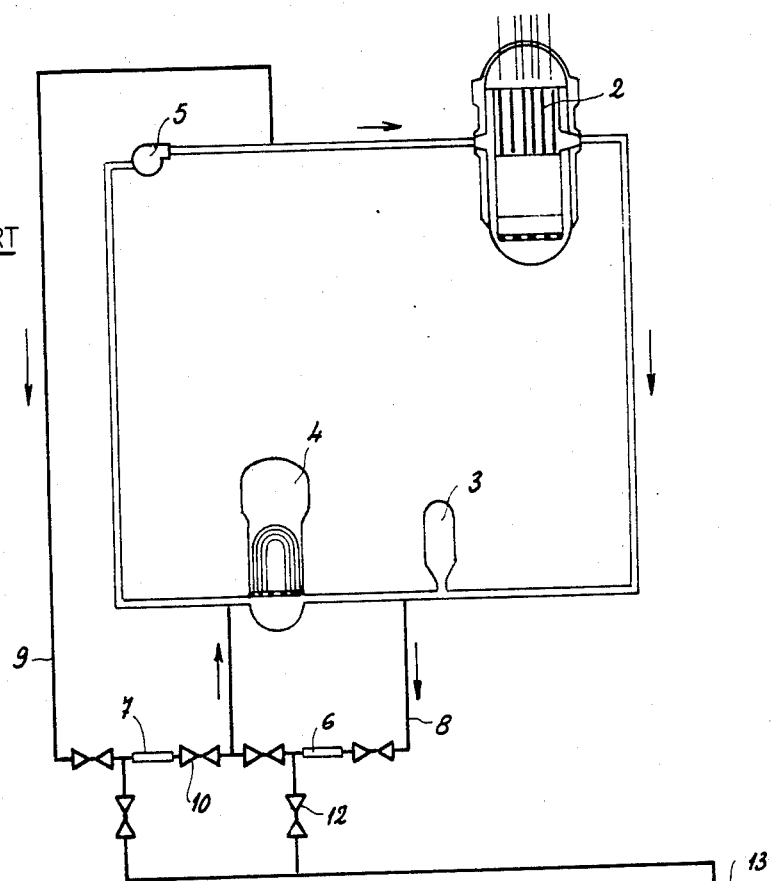
FIG. 1 is a flow diagram of the primary coolant loop of a pressurized water reactor provided with prior art temperature sensors.

In FIG. 1 we have shown a prior art primary coolant loop for a pressurized water nuclear reactor. The primary pump 5 feeds the water to the reactor at an elevated pressure and a pressurizer or accumulator 3 is provided upstream of the steam or vapor generator represented as a boiler 4.

The temperature sensors are here represented at 6 and 7 and are disposed in respective circuits 8 and 9 corresponding to hot and cold loops, respectively forming bypasses of the main coolant circulation path.

Obviously the presence of such additional bypass loops can create, in a nuclear reactor installation, problems which range from increased capital cost, because of the need to ensure that all of the auxiliary or bypass paths conform to the high safety standards for nuclear reactors, to the difficulty of replacing the temperature sensors. Large numbers of welded joints, valves and the like must be fabricated with the exceptional care required for nuclear reactor components and the bypass system effectively constitutes a thermal storage which effects the speed with which the sensors can respond to a change in conditions in the primary coolant.

Indeed, the need to remove the sensors in the course of use of the reactor makes it necessary to provide the isolating valves as well as valves 12 for voiding the radioactive liquid from the apparatus and a reservoir or other means shown at 13 to recover the voided radioactive liquid.

Figure 2:
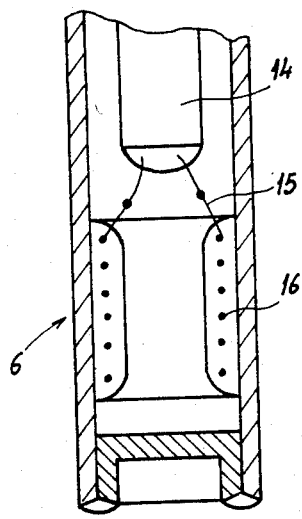
FIG. 2 is a section through a temperature sensor for prior art applications.

FIG. 2 shows a portion of a sensor 6 drawn to a larger scale. In this system a cable 14 has its two leads connected at 15 to the opposite ends of a platinum wire 16 shown disposed in a coil and whose resistivity is measured to indicate the instantaneous temperature.

Early systems of this type wire compelled to put up with the comparatively short life of the sensors and the fact that the piping in which the sensors are installed have a fragile characteristic made necessary by the need for means enabling rapid change of the sensors to minimize the presence in the contaminated or radioactive zones by the personnel for changing them.

Figure 3:
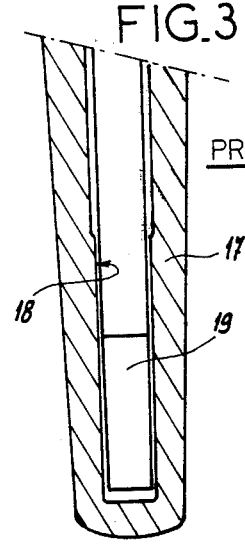
FIG. 3 is a section through another prior art sensor utilizing a closed-end sheath.

In a second arrangement also belonging to the prior art and represented in FIG. 3, the tubular sheath 17, which is closed at its end, has a cylindrical bore 18 in which the cylindrical sensor 19 with its platinum wire is received with clearance. Even the most precision manufacture of this assembly can not always ensure precise arrangements between the sensor 19 and the sheath 17 so that the response time of this unit is poor.

The inability to ensure precise positioning of the two components contributes to the sensitivity of the instrument to vibration, such vibration causing rapid deterioration of the sensor.

Figure 7:
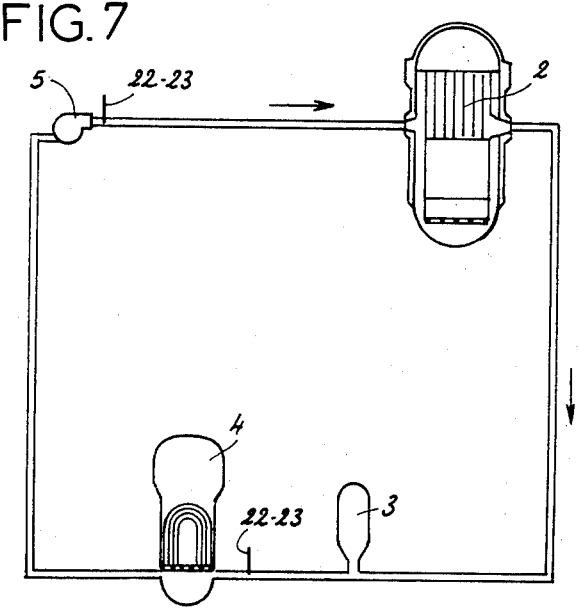
FIG. 7 is a flow diagram showing the application of the sensor of the invention to a pressurized water reactor and also illustrating the reduction in the complexity of the piping arrangement thereby obtained.

The sensor shown in FIGS. 4–6 and 8 can be utilized by threading it directly into a pipe 20 of the circulation and indeed two sensors are shown in the primary coolant circulation of FIG. 7 at 22, 23.

In particular, each sensor comprises a tubular sheath 22 which is closed at its end projecting into the path of the liquid in the pipe, this sheath being constituted like a rigid finger of a glove whose open end is accessible from the exterior of the pipe 20.

The temperature sensor 23 is removably received in this sheath.

Approximately midway along its length, the sheath 22 is provided with a male thread which is engaged in a female thread of the pipe 20, the threaded connection being represented at 24 and being sealed by a weld deposit 25 all around the instrument.

Over close to its entire length, the sheath 22 is provided with a cylindrical bore 26 extended at the closed end of the sheath by a blind bore 27 of frustoconical form.

Figure 4:
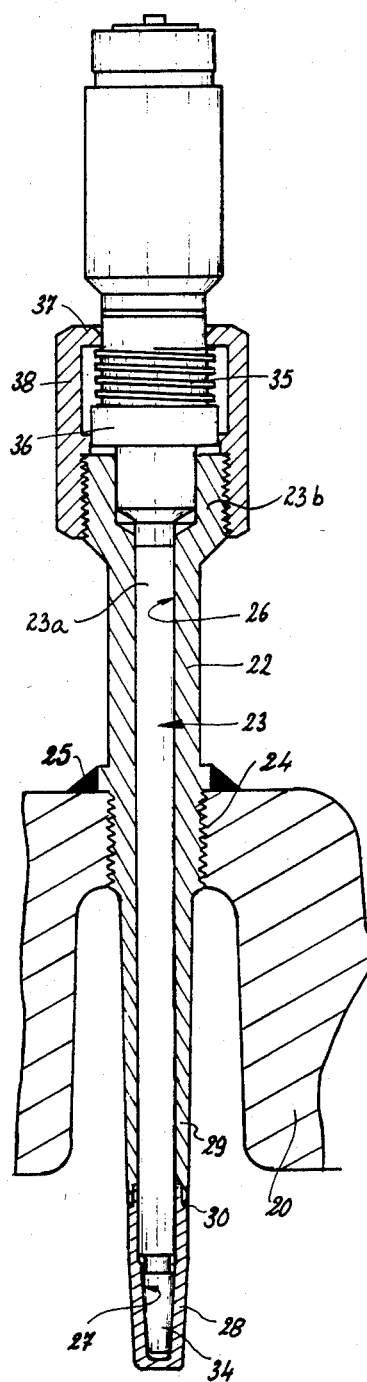
FIG. 4 is an axial section through a temperature measuring instrument according to the invention.

In the embodiment of FIG. 4 beyond the cylindrical bore, the frustoconical bore 27 is formed in a cap fitted by a joint 30 sealingly welded onto the sheath 22. The latter thus is composed of two parts, namely, the principal part 29 provided with a cylindrical bore and the cap part 28. A butt weld may seal these two parts together at the joint 30.

Alternatively, the frustoconical part may be formed in the piece 29 (FIG. 6) and the frustoconical end can be closed by a plug 32 welded to the main part of the sheath at 33.

Figure 5:
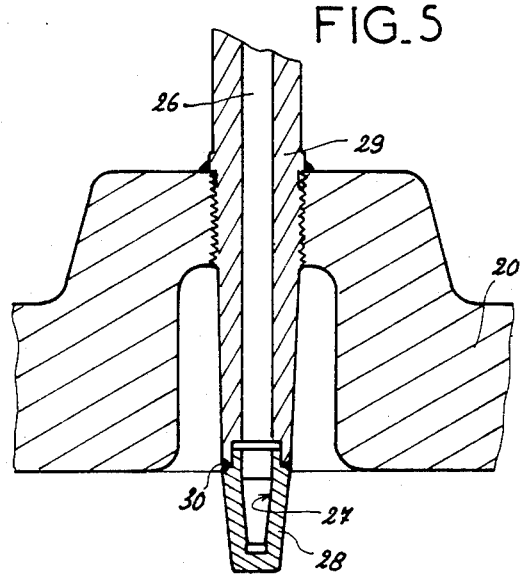
FIG. 5 is a detail view in section of a sensor according to another embodiment of the invention.
Figure 6:
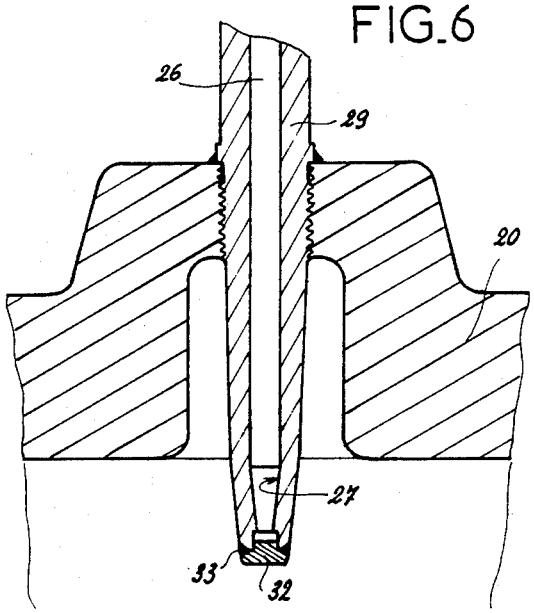
FIG. 6 is a section through the tip portion of a third embodiment of the invention.

In the embodiment of FIG. 5, the cap 28 is slightly shorter than that of FIG. 4.

Figure 8:
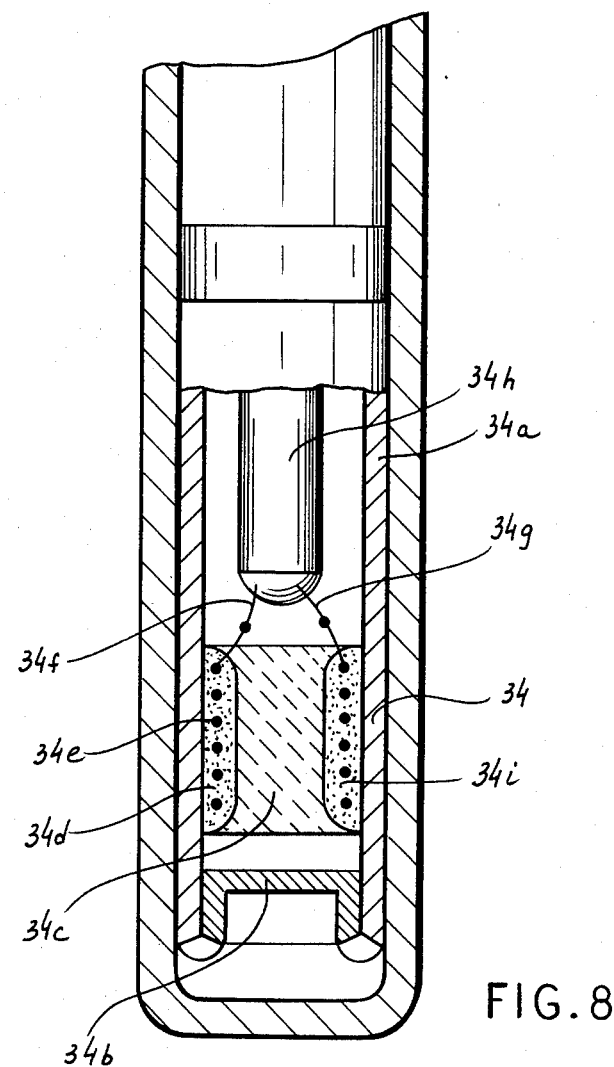
FIG. 8 is a section through the tip portion of a sensor according to the invention.

FIG. 4 also shows the sensor 23 which is of generally cylindrical form and has an end hereinafter referred to as a tip, which is likewise frustoconical and which, as can be seen from FIG. 8, can be defined by a frustoconical shell 34a receiving a plug 34b and a coil holder 34c of electrically nonconductive material defining a space 34d receiving the turns 34e of a platinum wire coil whose ends 34f and 34g are connected to the conductor cable 34h and are led thereby out of the sensor.

Compacted boron nitride can be provided around turns and between the turns and the shell 34a for effective heat conduction between this silver shell and the platinum wire.

The temperature measuring instruments 22, 23 can be disposed directly in the primary cooling path (FIG. 7) advantageously immediately downstream of the pump 5 and immediately upstream of the boiler 4 although other arrangements may be used.

As can be seen from FIG. 4 as well the tip 34 is connected to a cylindrical shank 23a formed at its upper and with an annular shield 36 against which a coil spring 35 is seated. A boss 23b at the upper end of the shank 23a is externally threaded and can be engaged by a threaded sleeve 38 having an inwardly extending overhang 37 against which the spring 7 bears.

By simply loosening the sleeve 38 and removing it, the pressure of the coil spring sealing the tip 34 in the frustoconical bore 27 will be eliminated and the sensor easily withdrawn from the sheath.

It will be apparent, therefore, that the sensor of the invention can be readily replaced and removed and tests have shown that the frustoconical fit of the tip 34 in the bore prevents detrimental vibration and provides greatly increased response rates. Naturally the need for bypass piping is also avoided.

We claim:

1. A temperature sensing instrument for direct mounting in a wall of a structure traversed by a primary coolant of a pressurized water reactor, comprising:
   a thermally conductive finger-shaped sheath closed at one end and extending through said wall so that a closed end of said sheath is disposed within said structure in direct contact with said coolant, said closed end being formed with a frustoconical blind bore tapering generally toward said closed end and having an internal surface; and
   a temperature sensor received in said sheath and having a frustoconical tip with an external surface tapered substantially to match said frustoconical bore and lodged therein in surface contact therewith at said surfaces, both of said surfaces being treated to limit the roughness of the surfaces in surface contact, said sensor comprising:
      an elongated body of pure silver formed with a central hollow,
      a platinum sensor element wire received in said hollow, and
      a packing of high thermal conductivity boron nitride received between said wire and an inner wall of said tip and in contact with said wire and said inner wall.

2. The instrument defined in claim 1, further comprising elastic means based between said temperature sensor and said sheath for pressing said sensor in the direction of taper of said tip against said sheath, thereby pressing said surfaces together.

3. The instrument defined in claim 2 wherein said sheath is formed externally of said structure with a thread, further comprising a sleeve engaging said thread and forming a seat for said spring, said sensor having a shoulder forming another seat for said spring.

4. The instrument defined in claim 3 wherein said tip and said blind bore are frustoconical with their respective generatrices including an angle of 3 degrees to a tolerance of about 1 minute with the respective axes thereof.

5. The instrument defined in claim 4 wherein said tip and said blind bore have mutually contacting surfaces, said surfaces having a roughness such that the arithmetic mean of the magnitude of said roughness is less than 0.2.

6. The instrument defined in claim 5 wherein said sheath is formed in two parts including a first cylindrical part open at both extremities, and a cap closing said first part and formed with said blind bore.

7. The instrument defined in claim 1 wherein said sheath is formed in two parts including a first cylindrical part open at both extremities, and a cap closing said first part and formed with said blind bore.

8. The instrument defined in claim 5 wherein the portion of said sheath provided with said blind bore is formed unitarily with the remainder of said sheath.

9. The instrument defined in claim 1 wherein the portion of said sheath provided with said blind bore is formed unitarily with the remainder of said sheath.

10. The instrument defined in claim 5 wherein said blind bore is formed on said sheath unitarily with a portion of said sheath formed with said cylindrical bore, said blind bore being closed at its small-diameter end by a plug received in said sensor.

* * * * *